(12) United States Patent
Levine et al.

(10) Patent No.: US 8,037,109 B2
(45) Date of Patent: Oct. 11, 2011

(54) GENERATION OF REPEATABLE SYNTHETIC DATA

(75) Inventors: Charles J. Levine, Redmond, WA (US); Jamie A. Reding, Woodinville, WA (US); Sergey Vasilevskiy, Kirkland, WA (US)

(73) Assignee: Microsoft Corporation, Remond, WA (US)

( * ) Notice: Subject to any disclaimer, the term of this patent is extended or adjusted under 35 U.S.C. 154(b) by 277 days.

(21) Appl. No.: 10/610,690

(22) Filed: Jun. 30, 2003

(65) Prior Publication Data

US 2004/0267773 A1    Dec. 30, 2004

(51) Int. Cl.
*G06F 19/00* (2006.01)
*G06F 7/00* (2006.01)
*G06F 17/30* (2006.01)

(52) U.S. Cl. ........................................ 707/804; 702/123
(58) Field of Classification Search ................... 707/100, 707/804, 803, 802, 790, 999.1, 999.101, 707/999.102; 702/1, 123, 108
See application file for complete search history.

(56) References Cited

U.S. PATENT DOCUMENTS

| | | | | |
|---|---|---|---|---|
| 6,324,647 | B1 * | 11/2001 | Bowman-Amuah | 726/23 |
| 6,502,102 | B1 * | 12/2002 | Haswell et al. | 707/102 |
| 6,636,585 | B2 * | 10/2003 | Salzberg et al. | 379/22 |
| 2002/0101920 | A1 * | 8/2002 | Choi et al. | 375/240 |
| 2004/0199328 | A1 * | 10/2004 | Croker | 702/1 |
| 2005/0246390 | A1 * | 11/2005 | House et al. | 707/200 |

FOREIGN PATENT DOCUMENTS

JP    2000020529 A * 1/2000

OTHER PUBLICATIONS

Gray et al., Quickly Generating Billion-Record Synthetic Databases, May 1994, ACM Press.*
Chays et al., Demonstration of Agenda Tool Set for Testing Relational Database Applications, May 2003, IEEE-Software Engineering, 2003. Proceedings. 25th International Conference.*
Hameed et al., Framework for Intelligent Meaningful Test Data Generation Model-IMTDG, Sep. 2000, IEEE-TENCON 2000 Proceedings, vol. 2.*
Chays et al., A Framework for Testing Database Applications, 2000, ACM Press.*
Garfinkel, Simson et al., "Practical UNIX and Internet Security" O'Reilly, $3^{rd}$ Edition, p. 1-4.*
Duckworth, Brian P., "Random Numbers" Jun. 2002, www.vbexplorer.com via archive.org <http://web.archive.org/web/20020606040446/http://www.vbexplorer.com/VBExplorer/random/random_numbers_1.asp> p. 1-3.*

(Continued)

*Primary Examiner* — Brent Stace
(74) *Attorney, Agent, or Firm* — Woodcock Washburn LLP

(57) ABSTRACT

Systems and methods are provided for the generation of synthetic repeatable data. In an illustrative implementation, an exemplary data environment comprises at least one computing application for the management, manipulation, and generation of data. The computing application operates on a predefined set of rules to generate a data set, having N elements, using a deterministic generator function which when executed always produces the same set of data. The seed is used to position the generator to a particular point in its sequence. To regenerate any particular entry in the data set, the generator, using the seed as an input, is executed and the desired data is re-generated. The illustrative implementation also contemplates that the generation of data may be parallelizable as each element is generated independently of any others.

15 Claims, 4 Drawing Sheets

OTHER PUBLICATIONS

Carter, Skip, "Linear Congruential Generators" Jan. 9, 1996, www.taygeta.com, p. 1.*

Bacon, D.P. et al., "Generation of Synthetic Satellite Data with OMEGA", *Infrared Remote Sensing of Clouds and the Atmosphere II*, Sep. 26-28, 1994, Rome, Italy, SPIE 2309,161-167.

Hromadkha, T.V., "A Rainfall-Runoff Probabilistic Simulation Program.1. Synthetic Data Generation", *Environmental Software*, 1996, 11(4), 235-242.

Varga, T. et al., "Generation of Synthetic Training Data for an HMM-based Handwriting Recognition System", 5 pages.

TPC BENCHMARK™ C, Standard Specification Revision 5.1, *Transaction Processing Council (TPC)*, 2002, www.tpc.org 1-133.

Park, S.K. et al., "Random Number Generators: Good Ones are Hard to Find", *Communications of the ACM*, Oct. 1998, 31(10), 1192-1201.

Azalov, P. et al., "SDG—A System for Synthetic Data Generation", *International Conference on Information Technology: Computers and Communications*, 2003, 69-75.

Azalov, P. et al., "SDG—A System for Synthetic Data Generation", *International Conference on Information Technology: Computers and Communications*, 2003, 69 (1 page)(Abstract Only).

* cited by examiner

GENERATION OF REPEATABLE SYNTHETIC DATA

FIELD OF THE INVENTION

The invention generally relates to data storage and retrieval systems, and, more particularly, to the generation of repeatable synthetic data for use to test and optimize data storage and retrieval systems' performance and operations.

BACKGROUND OF THE INVENTION

As computing and communications technologies have advanced, there has been and continues to be a globalization of market places and the expansion of business and governmental enterprises alike. The geographic limitations of sharing data and information across large spans are becoming a distant memory. Moreover, with these technological advances, computing applications which were once slated for use on stand alone machines are being deployed across, what are often, large computing environment networks and platforms. As more data and computing applications become shared, there arises a need to monitor and control the systems that house data to ensure that they are properly functioning and protect against unwanted down time which could translate into lost revenues.

An enterprise's computing environment might contain hundreds of server computers and, possibly, thousands of client computers, all in communication to share applications and application data. Such computing environment might also support vast data stores for use to store application data. Today's data stores, or databases, are designed to operate on a single stand alone machine or among several computing machines (e.g. computer database servers) and cooperate with the computing environment to accept data for storage and/or to provide data to a requesting application. Given the importance of an enterprise's data, significant efforts have and are being made to ensure that the database and applications which use it operate in an optimal manner. One approach is to test the database and/or applications using a pre-defined benchmark. The benchmark, among other things, measures the capacity and operational efficiency of the database and corresponding, cooperating computing applications. Benchmarking a system having a database and application(s) may require the ability to generate repeatable synthetic data to populate the database prior to the test and then selectively regenerate that data during benchmark testing.

Currently, there exists a number of techniques which are used to generate synthetic data for use in benchmarking and other testing activities such as quality assurance testing. One approach is to employ techniques that use a random number generator function to produce random numbers, letters, and/or strings to generate a set of data. Comparatively, a deterministic generator function is one in which the same set of data is generated identically each time the deterministic generator function is executed having a set input.

The drawback with existing practices, however, is that for a data set having N elements, the entire data set must be generated each time a singular data set element requires regeneration. For example, it might be the case that a data set of ten million customer names is generated according to current practices. The customer name consists of a first name and a last name. A deterministic generator function may be used to generate ten million names by randomly picking a first and last name from lists of first an last names. To regenerate the name of the one millionth customer (or the 4 millionth customer, etc.), current practices require the regeneration of all prior names (i.e. 1-999,999 names) in order that the random number generator be positioned at exactly the same point in its sequence. Such practice is extremely inefficient to the point of being impractical.

Consequently, current practices rely on the generation of synthetic data which follows highly predictable patterns. This results in data with regular observable patterns which compromises the realism of the test. For example in the TPC-C benchmark (e.g. an example of current practices), last names are generated by concatenating three syllables chosen from a set of ten. The ten are "BAR, "OUGHT", "ABLE", "PRI", "PRES", "ESE", "ANTI", "CALLY", "ATION", and "EING". With ten syllables used three times, there are 1000 unique combinations, which can be mapped to the values 000 to 999. For example, 000 maps to "BARBARBAR", and 321 maps to "PRIABLEOUGHT." Such method provides data which is easily reproduced, but is very unrealistic.

From the foregoing it is appreciated that there exists a need of systems and methods that overcome the prior art.

SUMMARY OF THE EMBODIMENTS OF THE INVENTION

Systems and methods are provided for the generation of synthetic repeatable data. In an illustrative implementation, an exemplary data environment comprises at least one computing application for the management, manipulation, and generation of data. The computing application operates on a predefined set of rules to generate a data set, having a predefined number of elements, using a deterministic generator function. A seed is chosen within the range of values allowed by the generator function. The seed is used to position the generator to a particular point in its sequence. Subsequently, to regenerate any particular entry in the data set, the generator, using the seed as an input, is executed and the desired data is regenerated.

The illustrative implementation also contemplates that the generation of data be parallelizable as each element is generated independently of any others.

Other features are described in more detail below.

BRIEF DESCRIPTION OF THE DRAWINGS

The herein described systems and methods are further described with reference to the accompanying drawings in which.

DETAILED DESCRIPTION OF ILLUSTRATIVE EMBODIMENTS

Overview

There is work currently underway to construct a new benchmark to measure OLTP database performance. The proposed benchmark defines a database schema and relationships between the tables. The database is loaded with synthetic data which is programmatically generated. To make the workload representative of real world environments, the synthetic data is very realistic (e.g., customer names are randomly drawn from weighted distributions of actual first and last names from US census data). While this realism makes for a more representative benchmark, it requires that the driver program have a way to know what names exist in the database. For example, if the database is loaded with 10,000 particular customer names from 65 million possible combinations, the driver, preferably selects names that are known to be in the particular set of 10,000. One approach, to date, to solve this problem is for the driver to have a copy of the database. Such solution, however, becomes impractical as the database becomes large. Specifically, the cost of storage (i.e. the storage of an entire data set) make the above approach impractical.

The herein described systems and methods aim to ameliorate the shortcomings of existing practices by providing the generation of repeatable synthetic data which can be readily regenerated in highly granular increments. Specifically, the herein described system and methods relate to the synthetic data generation that is relevant to performance testing. More generally, it is also applicable to performance and/or QA testing of a Web server, email server, web search engine, business applications, file systems, login accounts and passwords, word processors, and spreadsheets. Generically, the described inventive concepts may be applied to any application that stores information and then operates on the content of that information.

An illustrative computing application is provided having one or more instruction sets to instruct a computing environment to generate repeatable synthetic data. In operation, a set of data is generated using a generator function. When a particular element or group of elements of the generated data set are required to be regenerated, instead of regenerating the entire set, the generator function is positioned to the appropriate point in the sequence by setting a seed value. The value of the seed is within the range allowed by the parameters of the generator function. As such the above described inefficiencies are obviated.

A. Exemplary Computing Environment

Figure 1:
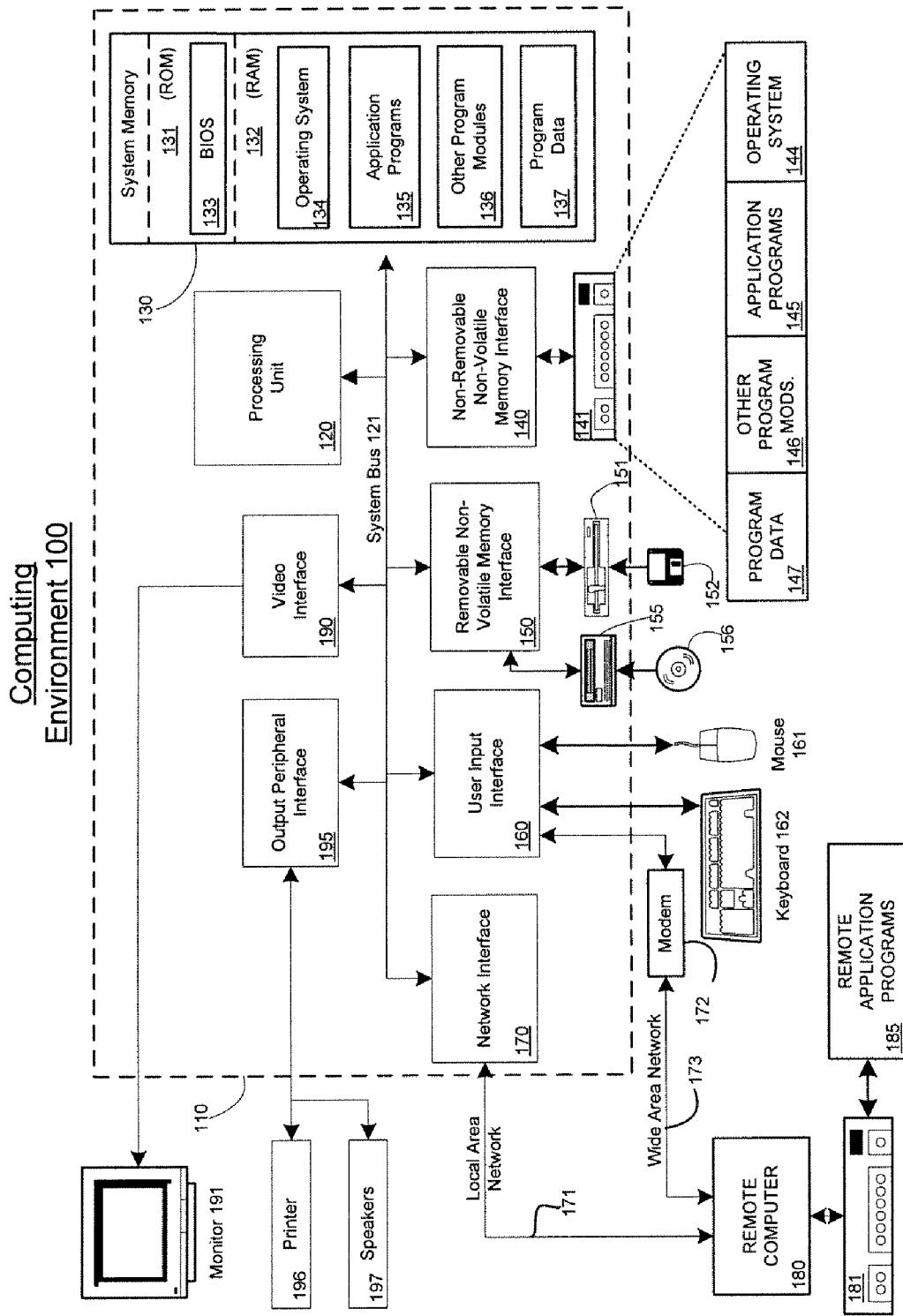
FIGS. 1 and 2 are schematic illustrations of exemplary computing environments suitable for the present invention, with FIG. 2 depicting an exemplary networked computing environment.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
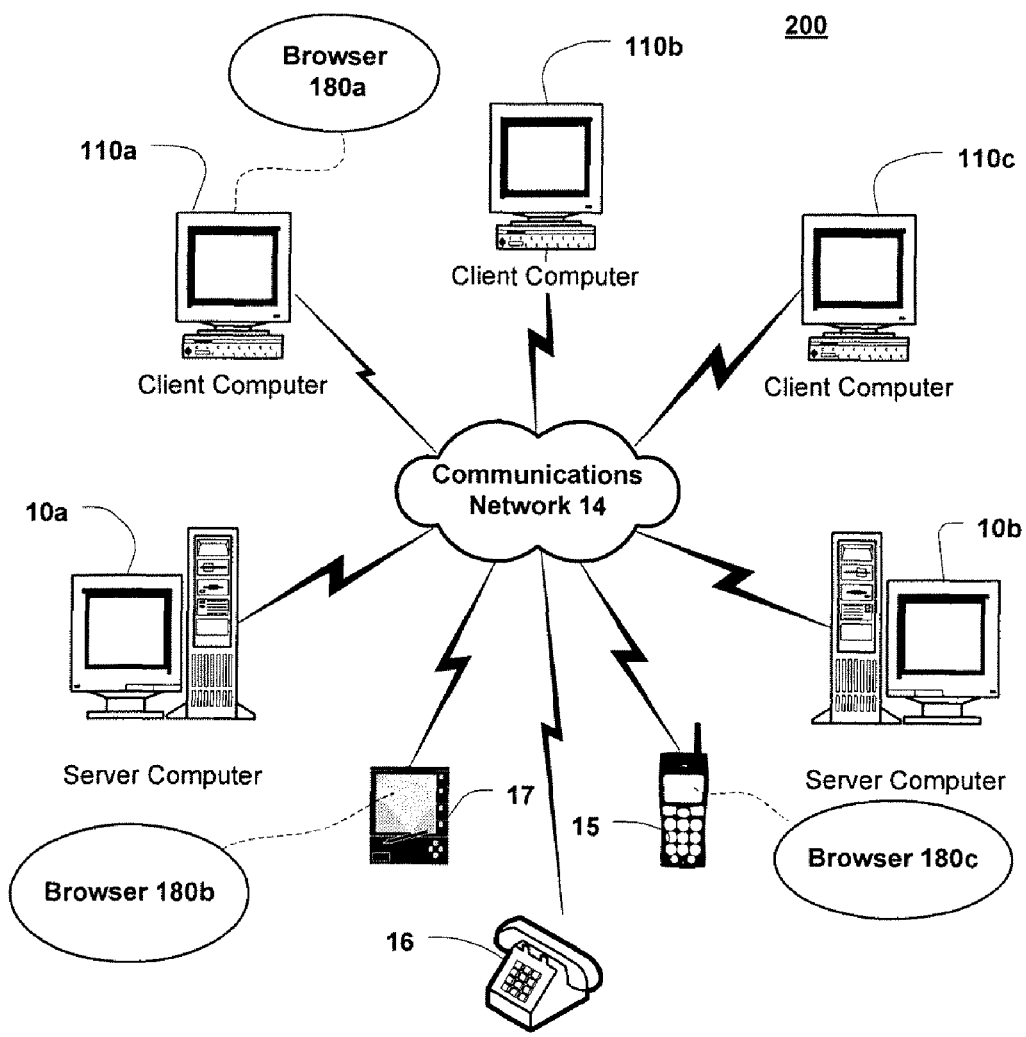

Computer environment 100, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 14 (which may be a LAN, WAN, intranet, the Internet, or other computer network) with a number of client computers 110a, 110b, 110c, or computing devices, such as, mobile phone 15, land-line telephone 16, and personal digital assistant 17. In a network environment in which the communications network 14 is the Internet, for example, the servers 10 can be Web servers with which the clients 110a, 110b, 110c communicate via any of a number of known protocols, such as, hypertext transfer protocol (HTTP) or wireless application protocol (WAP). Each client computer 110a, 110b, or 110c can be equipped with browser 180a to gain access to the servers 10. Similarly, personal digital assistant 17 can be equipped with browser 180b and mobile phone 15 can be equipped with browser 180c to display and receive various data.

In operation, a user (not shown) may interact with a computing application running on a client computing devices to generate repeatable synthetic data. The generated data may be stored on server computers and communicated to cooperating users through client computing devices over communications network 14. A user may generate, manage, and interact with such generated synthetic data by interfacing with computing applications on client computing devices. These operations may be communicated by client computing devices to server computers for processing and storage. Server computers may host computing applications for use in the generation of the repeatable synthetic data.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. Generation of Synthetic Data

The generation of synthetic data may be described by the following example:

A generator function is described as follows:

Given:
   modulus: m—a large prime integer
   multiplier: a—an integer in the range 2, 3, . . . , m−1
and the subsequent generation of the integer sequence $z_1$, $z_2$, $z_3$ . . . via the iterative equation $$z_{n+1} = f(z_n) \text{ for } n=1, 2, \ldots$$

where the generating function f(•) is defined for all z in 1, 2, . . . , m−1 as $$f(z) = az \bmod m.$$

Such function is known as a linear congruential generator. When executed, for carefully chosen values of a and m (such as a=16807 and m=$2^{31}$−1), the function generates all values between 1 and m−1 without repetition and the sequence satisfies various statistical tests for randomness. The value z is sometimes referred to as a seed. For any value z between 1 and m−1, the generator will generate all values in the set {1 . . . m−1} (excluding z) exactly once before getting back to z.

In practice, f(z) is typically implemented such that the output value ($z_{n+1}$) is stored and used on the next invocation of the generator function, f( ), if the seed value is omitted. Hence, the sequence f($z_n$), f( ), f( ), would return the values $z_{n+1}$, $z_{n+2}$, $z_{n+}3$, respectively.

The function f( ) can be used to generate random numbers between 0 and 1 as:

rnd( )=f( )/m

A random floating point number between 0 and 1 is easier to use than a random integer in the range of 1 to m−1. Following are examples of how this generator function may be used:

(1) to generate a tax rate in the range of 0.00% to 15.00% (a precision of two digits after the decimal place), the equation is:

tax=int(rnd( )*1500)/100.0

(2) to generate a string of random upper case letters that is n characters long, the code is:

```
char str[n];
for (i = 0; i<n; i++)
    str[i] = 65 + (rnd( ) * 26)    // 26 letters in the alphabet;
                                   // letter 'A' is ASCII value 65.
```

These functions in operation are deterministic. That is, for any particular value of the initial seed to the random number function, the output will always be the same. The same generator functions may be employed to generate more sophisticated data, for example, people's names. In an illustrative implementation, there are a number of first and last names in use. For example, the list may comprise the US census lists of first and last names. In such lists, there are (approximately) 1000 female first names, 1000 male first names, and 65000 last names.

For example:

TABLE 1

| | Female first names |
|---|---|
| 1 | Beth |
| 2 | Cynthia |
| 3 | Jennifer |
| 4 | Lisa |
| 5 | Margaret |
| 6 | Mary |
| 7 | Robin |
| 8 | Sally |
| 9 | Shirley |

TABLE 2

| | Male first names |
|---|---|
| 1 | David |
| 2 | George |
| 3 | Joe |

TABLE 2-continued

| | Male first names |
|---|---|
| 4 | John |
| 5 | Michael |
| 6 | Robert |
| 7 | Sam |
| 8 | Tim |

TABLE 3

| | Last names |
|---|---|
| 1 | Armstrong |
| 2 | Beckman |
| 3 | Bush |
| 4 | Cooper |
| 5 | Franklin |
| 6 | Hunt |
| 7 | Jones |
| 8 | Niven |
| 9 | Smith |
| 10 | Turner |

A name can be given more weight by repeating it in the table. For example, there might be many Smith's and Jones's, but very few Niven's. In the provided exemplary illustrative implementation, the name can be generated according to the following method, first pick a gender—such step may be realized by getting a random number and mapping it to male and female, such as:

if (rnd( )<0.5) then gender="M" else gender="F"

The second step is to pick a first name. This may be accomplished by generating a random number between 1 and n (where n is the number of entries in either Table 1 or Table 2) and using the value as an index into the table to get the corresponding name. (To generate a random number between 1 and n, an exemplary equation which may be used is: int (rnd( )*n)+1) Lastly, a last name is picked by generating a random number between 1 and n (where n is the number of entries in either Table 3 regardless of gender), as determined by the second described step and using the value as an index into the table to get the corresponding last name.

The sequence above is deterministic for a given sequence of values from the random number function. Also, the number of possible unique names is the number of unique combinations of first and last name. That is, with 1,000 first names and 65,000 last names, there are 65 million unique combinations per gender.

The herein described systems and methods provide the generation of data according to the above described technique wherein the process of generating the data starts from a known seed. In operation, the seed is used to "position" the random number generator to a particular point in its sequence. For example, looking to the above-described example of a database with a million names, the herein described systems and methods contemplate the setting of the generator seed prior to generating each name. So that, for a million names, the generator seeds that may be used are seeds 1 to 1,000,000. To regenerate any particular entry we simply need to set the seed and regenerate it.

An alternate illustrative technique for setting the seed value is to advance the random number generator sequence by a certain number of steps from a selected seed. For example, for a selected seed of z, the generator can be advanced by 100 increments per customer or $z_{100n}$. In this case, the seed for customer 1 would be a $z_{100}$ and for customer 99 would be $z_{9900}$. This approach is feasible if the n-th element of the sequence can be efficiently computed, which is the case for generators of the form $f(z)=az \bmod m$, as described above.

It is appreciated that the preceding description is a specific application of the technique and that the inventive concepts described herein can be generalized to the generation of any type of synthetic data which is pseudo-random but also easily regenerated. For example, if a CUSTOMER table is being populated, wherein the CUSTOMER table contains name, gender, tax ID, address, phone number, and birth date, the fields could be generated using the random number function after setting the seed for each CUSTOMER row. The seed could be set once and the fields generated serially or the seed could be set prior to generating each field. If the fields are generated serially by setting the seed only once, then it means that to regenerate the n-th field you must regenerate the preceding n−1 fields (or at least know exactly how far to advance the random number function). Moreover, the inventive concepts described herein are easily parallelizable since each element is generated independently of any others, rather than being done serially.

Moreover, it is appreciated that the exemplary generator functions provide above are merely illustrative, and that the inventive concepts are not limited to this specific example. Rather, the inventive concepts described herein contemplate the use of a variety of data generation functions which generate a sequence of values without repetition until coming back to the starting point (e.g. seed value) and where the sequence is repeatable (deterministic).

1. TPC Benchmark

The description of the TPC Benchmark C in the following three paragraphs is reproduced from the Transaction Processing Performance Council (TPC)© 2002 Transaction Processing Performance Council. It is appreciated that the TPC Benchmark is provided merely as an example of the type of benchmark in which the herein described systems and methods may be implemented.

The TPC Benchmark™ (TPC-C) is an online transaction processing (OLTP) workload. It is a mixture of read-only and update intensive transactions that simulate the activities found in complex OLTP application environments. It does so by exercising a breadth of system components associated with such environments, which are characterized by: 1) The simultaneous execution of multiple transaction types that span a breadth of complexity; 2) On-line and deferred transaction execution modes; 3) Multiple on-line terminal sessions; 4) Moderate system and application execution time; 5) Significant disk input/output; 6).

Transaction integrity (ACID properties); 7) Non-uniform distribution of data access through primary and secondary keys; 8) Databases consisting of many tables with a wide variety of sizes, attributes, and relationships; and 9) Contention on data access and update.

The performance metric reported by TPC-C is a "business throughput" measuring the number of orders processed per minute. Multiple transactions are used to simulate the business activity of processing an order, and each transaction is subject to a response time constraint. The performance metric for this benchmark is expressed in transactions-per-minute-C (tpmC). To be compliant with the TPC-C standard, all references to tpmC results must include the tpmC rate, the associated price-per-tpmC, and the availability date of the priced configuration.

Although these specifications express implementation in terms of a relational data model with conventional locking scheme, the database may be implemented using any commercially available database management system (DBMS), database server, file system, or other data repository that provides a functionally equivalent implementation. The terms "table", "row", and "column" are used in this document only as examples of logical data structures.

It is appreciated that although the inventive concepts described herein are described in context of generating data for TPC benchmarking activities, that such description is merely exemplary, as the inventive concepts described herein may be applied in several areas as described above.

2. Generation of Repeatable Synthetic Data

Figure 3:
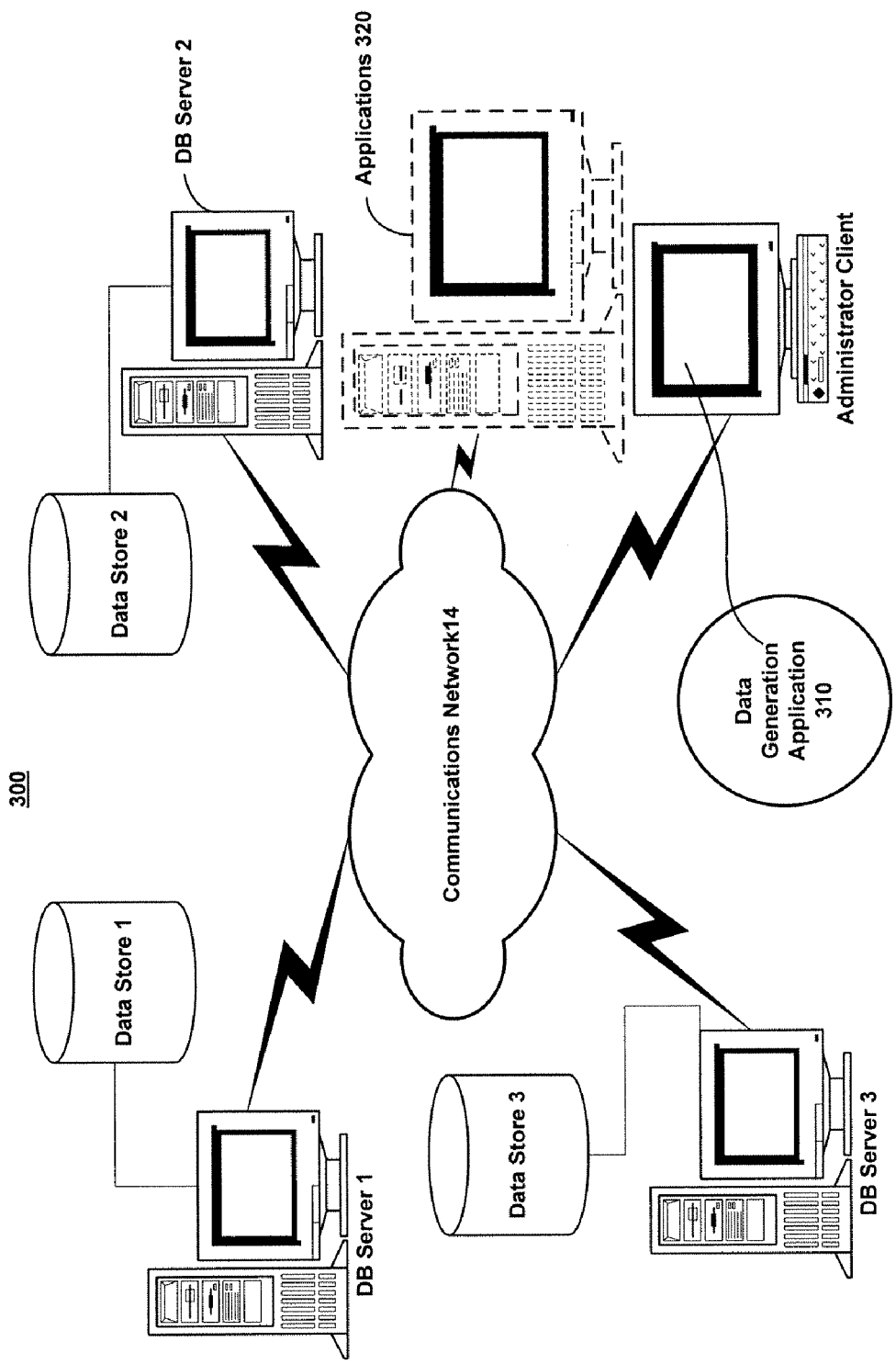
FIG. 3 is a block diagram of a data environment that supports the generation of repeatable synthetic data.

FIG. 3 shows exemplary data generation environment 300 supporting the generation of repeatable synthetic data. As shown exemplary database environment 300 comprises DB Server 1 maintaining Data Store 1, DB Server2 maintaining Data Store 2, DB Server3 maintaining Data Store 3, communications network 14, Applications 320, and Administrator Client executing data generation application 310. In operation, data for use by Applications 320 is communicated among any of DB Servers 1, 2, or 3 across communications network 14 to Applications 320. It is appreciated that Applications 320 may operate on a various computing environments as indicated by the Applications residing computer server figure having a dashed outline.

Data generation application 310 operating on Administrator Client communicates with DB Servers 1, 2, and 3 over communications network 14 to generate and communicate for storage repeatable synthetics data for subsequent processing. DB Servers 1, 2, and 3, maintaining Data Store 1, 2, and 3 together may operate to independently or may come together to form a single database being housed over four distinct computing environments. In this context, data generation application 310 may operate to generate specific data for each data environment comprising individually or collectively of Data Stores 1, 2, and 3. In addition to communicating with Data Stores 1, 2, and 3, data generation application 310 may cooperate with the any underlying computing environment operating environment operating on DB Servers 1, 2, and 3 on which Data Stores 1, 2, and 3 operate.

It is appreciated that although data generation system 300 is described in a particular configuration having a particular configuration of computing environments, database servers, data stores, and communications networks, that such description is merely exemplary as the inventive concepts described herein extend to various computing environments having various databases and their associated components arranged in various configurations and operating differently from the provided description.

Figure 4:
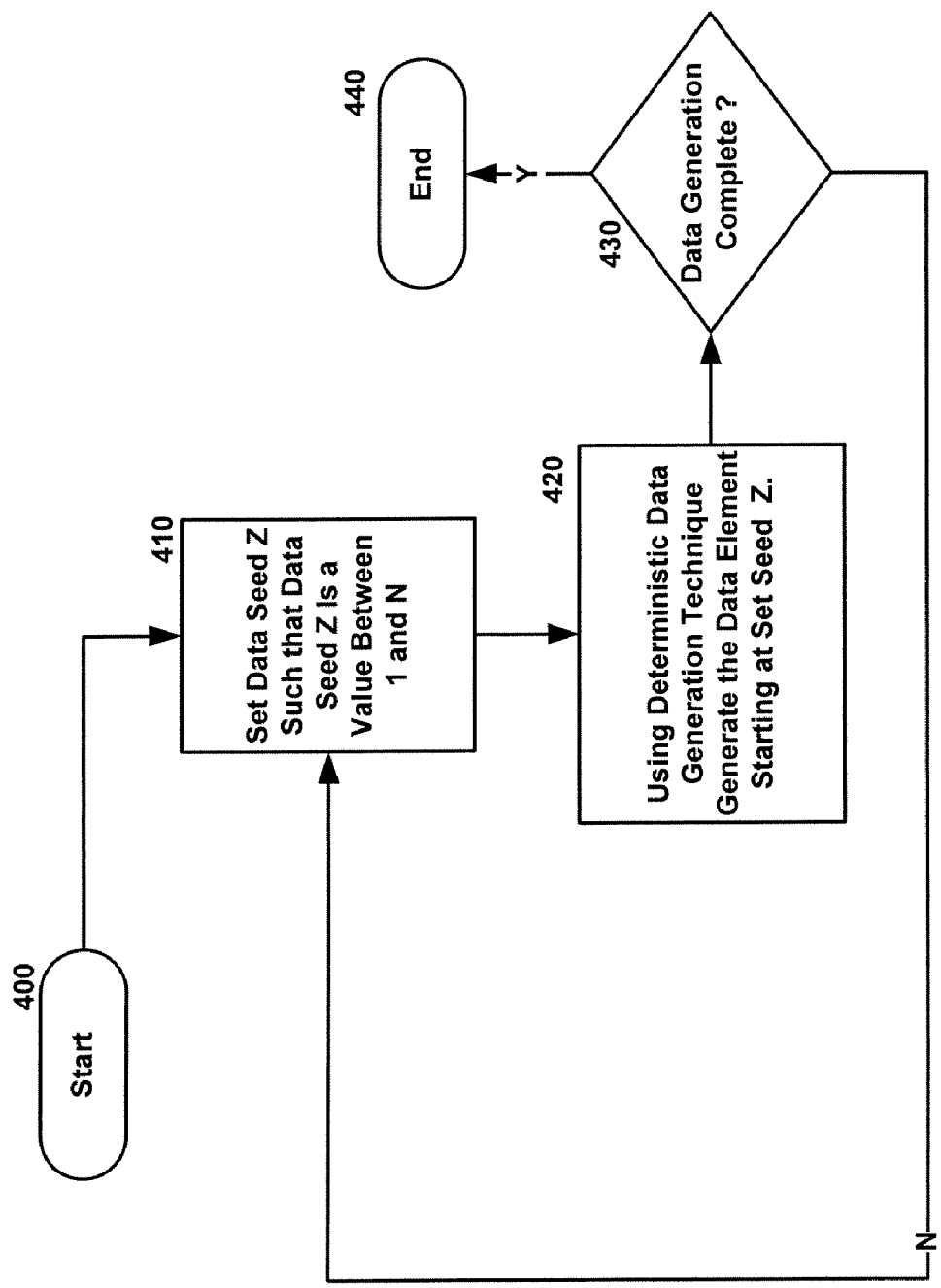
FIG. 4 is a flow diagram of the processing performed to generate repeatable synthetic data.

FIG. 4 shows the processing performed when generating repeatable synthetic data. As shown, processing begins at block 400 and proceeds to block 410 where a data seed Z is set such that the data set Z is a value between 1 and N. Using a deterministic data generation technique, at block 420, data is then generated starting from data seed Z. A check is then performed at block 430 to determine if the data generation is complete. If at block 430 it is determined that data generation is complete, processing proceeds to block 440 and then terminates. If, however, it is determined at block 430 that data generation is not complete, processing reverts to block 410 and proceeds.

D. Conclusion

The herein described systems and methods provide the generation of repeatable synthetic data for use in database environments. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed:

1. One or more computer-readable storage media having stored thereon a set of computer-executable instructions to perform a method for generating data, the method comprising:
    generating a plurality of collections of items of data each time the set of computer-executable instructions are executed, each of the collections comprising contents and a sequence, in which the contents of each of the collections are identical and the sequence of each of the collections are identical;
    accepting, as a first input to a first deterministic data generation module, at least one of: (a) data sets and (b) data elements from which first synthetic data is generated and output by the first deterministic data generation module, said first synthetic data having a sequence;
    determining a position of at least one of the items of data in the first synthetic data;
    determining a first seed based upon the position, the first seed configured to regenerate the at least one of the items of data;
    receiving the first seed as a second input to the first deterministic data generation module, the first seed configured to regenerate the at least one of the items of data at a first numerical position in the sequence of the first synthetic data, the first seed within a first allowable range of the first deterministic data generation module and configured to cause the first deterministic data generation module to generate the first synthetic data, the first synthetic data being repeatable, and the first deterministic data generation module configured to output a first random number using the first seed;
    determining a second seed as a third input to a second deterministic data generation module and corresponding to a second numerical position in a sequence of second synthetic data, the second seed within a second allowable range of the second deterministic data generation module, the second range being different than the first range and the second seed configured to cause the second deterministic data generation module to generate and output the second synthetic data, the first and second synthetic data being different, and the second seed configured to cause the second deterministic data generation module to output the second numerical position;
    inputting the second seed; and
    receiving a second random number associated with the second numerical position.

2. The one or more computer-readable storage media as recited in claim 1, wherein the computer-executable instructions comprise a computing application.

3. The one or more computer-readable storage media as recited in claim 2, wherein the computing application comprises a linear congruential generation function.

4. The one or more computer-readable storage media in claim 1, wherein the computer-executable instructions operate to generate data in a serial fashion.

5. The one or more computer-readable storage media as recited in claim 1, wherein the computer-executable instructions operate to generate data in a parallel fashion.

6. The one or more computer-readable storage media as recited in claim 1, wherein the method is performed in a database environment.

7. The one or more computer-readable storage media as recited in claim 1, wherein the first input comprises any of a range of letters, a range of numbers, a range of strings, a range of data sets, letters, numbers, strings, and data sets.

8. The one or more computer-readable storage media as recited in claim 1, wherein the method further comprises:
    using a communication means to communicate the first and second synthetic data to cooperating data environments.

9. The one or more computer-readable storage media as recited in claim 1, wherein the first and second synthetic data is data for use in benchmarking activities having a predefined data schema definition.

10. A computer-implemented method for generating data comprising:
    providing by at least one computer processor a first and second deterministic data generation module stored on at least one medium, the first and second deterministic data generation modules configured to accept inputs for processing to generate a plurality of data sets, each data set having synthesized data wherein within the data set each data element has a sequence number, and each data set is organized such that the data is positioned from a lowest sequence number to a highest sequence number in a sequential fashion, the synthesized data of each data set differing by using different seeds to generate the plurality of data sets;
    providing by the at least one computer processor first and second seeds as inputs to the respective first and second deterministic data generation modules, each of the seeds acting to position the respective first and second deterministic data generation modules at different positions such that different data are regenerated and have a different, predefined sequence number, wherein a value of each seed is derived from the predefined sequence number, and the sequence number represents a starting point from which the synthesized data is used as input to a process whose performance is to be evaluated, each of the seeds being within an allowable range of the data generation module and configured to cause the data generation module to generate the synthesized data which is repeatable; and schematizing the synthesized data of each data set according to a predefined data schema definition.

11. The computer-implemented method as recited in claim 10, further comprising communicating the synthesized data of each data set to cooperating data environments.

12. The computer-implemented method as recited in claim 10, further comprising changing the value of each of the seeds.

13. The computer-implemented method as recited in claim 10, processing the synthesized data of each data set by cooperating environments as part of a benchmarking study.

14. A method to generate repeatable synthesized data comprising:

executing by at least one computer processor first and second deterministic data generation functions to generate a plurality of data sets corresponding to sequential numbers, the numbers associated with a data element of each data set, each data element and associated number being different in each data set, the plurality of data sets generated by different seeds;

setting by the at least one computer processor respective ones of the seeds of a corresponding data set as input for the first and second deterministic data generation functions by positioning the first and second deterministic data generation functions at different positions such that the input drives the first and second deterministic data generation functions such that different data are regenerated and correspond to a different, particular sequential number, the seeds being within an allowable range of the first and second data generation functions and configured to cause the first and second data generation functions to generate synthetic data which is repeatable and different for each data set, the seeds being set for each discrete data element that are regenerated; and testing performance of a system by providing one of said data sets as input to said system and measuring behavior of said system using said one of said data sets.

15. A method for generating data, comprising:

determining by at least one computer processor a random data output of a random data generator, wherein the random data output comprises a repeatable sequence of a set of random numbers, wherein each of the random numbers of the first set comprises a numerical position;

determining by the at least one computer processor a first seed value corresponding to a first numerical position of the set of random numbers, the first seed value being within a first range and configured to cause the random data generator to output the first numerical position;

based on input of said first seed value, determining a first random number associated with the first numerical position;

determining a second seed value corresponding to a second numerical position of the set of random numbers, the second seed value being configured to cause the random data generator to output the second numerical position, the second seed value being within a second range, wherein the first and second seed values are different, and wherein the first range is different from the second range based on input of said second seed value, determining a second random number associated with the second numerical position; and testing performance of a system by providing one of the first and second random numbers as input to said system and measuring behavior of said system using said random data output.

* * * * *